United States Patent
Terra

(10) Patent No.: US 10,970,708 B2
(45) Date of Patent: Apr. 6, 2021

(54) PREDICTIVE DATA OBJECT ACQUISITION AND PROCESSING

(71) Applicant: Square, Inc., San Francisco, CA (US)

(72) Inventor: David Terra, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 495 days.

(21) Appl. No.: 15/417,888

(22) Filed: Jan. 27, 2017

(65) Prior Publication Data

US 2018/0189772 A1 Jul. 5, 2018

Related U.S. Application Data

(63) Continuation of application No. 15/396,609, filed on Dec. 31, 2016, now Pat. No. 10,402,816.

(51) Int. Cl.
*G06Q 20/34* (2012.01)
*G06K 7/00* (2006.01)
*G06F 12/02* (2006.01)

(52) U.S. Cl.
CPC ....... *G06Q 20/341* (2013.01); *G06F 12/0215* (2013.01); *G06K 7/0004* (2013.01); *G06K 7/0013* (2013.01); *G06Q 20/353* (2013.01); *G06Q 20/356* (2013.01); *G06Q 20/3552* (2013.01)

(58) Field of Classification Search
CPC .......... G06Q 20/3552; G06Q 20/35765; H04L 9/3247; G06F 12/0215
USPC .......................................................... 705/39
See application file for complete search history.

(56) References Cited

U.S. PATENT DOCUMENTS

| 3,128,349 A | 4/1964 | Boesch et al. |
| 4,150,784 A | 4/1979 | Moorman et al. |
| 4,776,003 A | 10/1988 | Harris |
| 4,860,336 A | 8/1989 | D'Avello et al. |

(Continued)

FOREIGN PATENT DOCUMENTS

| AU | 2324402 A | 6/2002 |
| AU | 2017245414 A1 | 11/2017 |

(Continued)

OTHER PUBLICATIONS

Contactless EMV: A Work in Progress: Both EMV and contactless payment are gaining ground. Work on a single contactless EMV standard has begun, but until it is complete, the major card organizations are making their own choices Author: Rueter, Thad (Year: 2006).*

(Continued)

*Primary Examiner* — Samica L Norman
*Assistant Examiner* — Mary M Gregg
(74) *Attorney, Agent, or Firm* — Maynard Cooper & Gale, P.C.; Brian T. Sattizahn, Esq.

(57) ABSTRACT

A payment terminal such as a payment reader may receive and form electrical connections with an electronic transaction card such as an EMV chip card. The payment terminal may provide power to the electronic transaction card and engage in communications with the electronic transaction card. Based on information received from the electronic transaction card, the payment terminal may predict the locations of data objects that must be accessed in order to process transactions. The data objects may be accessed based on the predictions and the transaction may be processed.

30 Claims, 7 Drawing Sheets

(56) References Cited

U.S. PATENT DOCUMENTS

| | | | |
|---|---|---|---|
| 5,221,838 A | 6/1993 | Gutman et al. | |
| 5,351,296 A | 9/1994 | Sullivan | |
| 5,388,155 A | 2/1995 | Smith | |
| 5,408,513 A | 4/1995 | Busch, Jr. et al. | |
| 5,714,741 A | 2/1998 | Pieterse et al. | |
| 5,729,591 A | 3/1998 | Bailey | |
| 5,740,232 A | 4/1998 | Pailles et al. | |
| 5,798,507 A | 8/1998 | Kawagishi et al. | |
| 5,838,773 A | 11/1998 | Eisner et al. | |
| 5,850,599 A | 12/1998 | Seiderman | |
| 5,867,795 A | 2/1999 | Novis et al. | |
| 5,940,510 A | 8/1999 | Curry et al. | |
| 6,010,067 A | 1/2000 | Elbaum | |
| 6,098,881 A | 8/2000 | Deland, Jr. et al. | |
| 6,098,888 A | 8/2000 | Praden | |
| 6,144,336 A | 11/2000 | Preston et al. | |
| 6,234,389 B1 | 5/2001 | Valliani et al. | |
| 6,278,779 B1 | 8/2001 | Bryant et al. | |
| 6,308,144 B1* | 10/2001 | Bronfeld | G06T 19/20 345/213 |
| 6,378,073 B1 | 4/2002 | Davis et al. | |
| 6,426,944 B1 | 7/2002 | Moore | |
| 6,481,623 B1 | 11/2002 | Grant et al. | |
| 6,702,182 B1 | 3/2004 | Kanayama | |
| 6,886,742 B2 | 5/2005 | Stoutenburg et al. | |
| 6,990,683 B2 | 1/2006 | Itabashi | |
| 7,003,316 B1 | 2/2006 | Elias et al. | |
| 7,066,382 B2 | 6/2006 | Kaplan | |
| 7,083,090 B2 | 8/2006 | Zuili | |
| 7,163,148 B2 | 1/2007 | Durbin et al. | |
| 7,210,627 B2 | 5/2007 | Morley et al. | |
| 7,363,054 B2 | 4/2008 | Elias et al. | |
| 7,370,804 B2 | 5/2008 | Ishii | |
| 7,424,732 B2 | 9/2008 | Matsumoto et al. | |
| 7,433,452 B2 | 10/2008 | Taylor et al. | |
| 7,591,425 B1 | 9/2009 | Zuili et al. | |
| 7,673,799 B2 | 3/2010 | Hart et al. | |
| 7,712,670 B2 | 5/2010 | Sauerwein, Jr. et al. | |
| 7,810,729 B2 | 10/2010 | Morley, Jr. | |
| 7,896,248 B2 | 3/2011 | Morley, Jr. | |
| 8,086,531 B2 | 12/2011 | Litster et al. | |
| 8,126,734 B2 | 2/2012 | Dicks et al. | |
| 8,265,553 B2 | 9/2012 | Cheon et al. | |
| 8,397,988 B1 | 3/2013 | Zuili | |
| 9,020,853 B2 | 4/2015 | Hoffman et al. | |
| 9,088,403 B1 | 7/2015 | Caggioni et al. | |
| 9,092,766 B1 | 7/2015 | Bedier et al. | |
| 9,286,494 B1 | 3/2016 | Lamfalusi et al. | |
| 9,317,848 B2 | 4/2016 | Hammad | |
| 9,424,445 B2 | 8/2016 | Lamfalusi et al. | |
| 9,652,641 B2 | 5/2017 | Lamfalusi et al. | |
| 9,679,286 B2 | 6/2017 | Colnot et al. | |
| 9,721,123 B1 | 8/2017 | Wade | |
| 9,760,743 B2 | 9/2017 | Lamfalusi et al. | |
| 9,858,448 B1 | 1/2018 | Terra et al. | |
| 9,881,337 B2* | 1/2018 | Jaycobs | G06F 3/04883 |
| 9,922,320 B2* | 3/2018 | Bonalle | G06Q 20/105 |
| 9,953,353 B2* | 4/2018 | Singhal | G06Q 30/0603 |
| 10,002,268 B1 | 6/2018 | Terra et al. | |
| 10,318,952 B1 | 6/2019 | Wade et al. | |
| 10,380,389 B1 | 8/2019 | Wade | |
| 2001/0029595 A1 | 10/2001 | Murata | |
| 2002/0060249 A1 | 5/2002 | Perron | |
| 2002/0091633 A1 | 7/2002 | Proctor | |
| 2002/0153414 A1 | 10/2002 | Stoutenburg et al. | |
| 2003/0067940 A1 | 4/2003 | Edholm | |
| 2003/0131191 A1* | 7/2003 | Zhang | G11B 20/10 711/113 |
| 2003/0135418 A1 | 7/2003 | Shekhar et al. | |
| 2003/0154414 A1 | 8/2003 | von Mueller et al. | |
| 2003/0183691 A1 | 10/2003 | Lahteenmaki et al. | |
| 2004/0005051 A1* | 1/2004 | Wheeler | H04L 9/3231 380/28 |
| 2004/0012875 A1 | 1/2004 | Wood | |
| 2004/0015418 A1* | 1/2004 | Dooley | G06Q 10/06 705/28 |
| 2004/0041911 A1 | 3/2004 | Odagiri et al. | |
| 2004/0059682 A1 | 3/2004 | Hasumi et al. | |
| 2004/0080973 A1* | 4/2004 | Ogura | G11C 15/00 365/145 |
| 2004/0124246 A1 | 7/2004 | Allen et al. | |
| 2004/0167820 A1 | 8/2004 | Melick et al. | |
| 2004/0179019 A1* | 9/2004 | Sabella | G09G 5/395 345/537 |
| 2004/0204082 A1 | 10/2004 | Abeyta | |
| 2005/0097015 A1 | 5/2005 | Wilkes et al. | |
| 2005/0109841 A1 | 5/2005 | Ryan et al. | |
| 2005/0132151 A1* | 6/2005 | Kuriyama | G06F 21/445 711/154 |
| 2005/0156026 A1 | 7/2005 | Ghosh et al. | |
| 2005/0184164 A1 | 8/2005 | De Jong | |
| 2005/0236480 A1 | 10/2005 | Vrotsos et al. | |
| 2006/0032905 A1 | 2/2006 | Bear et al. | |
| 2006/0049255 A1 | 3/2006 | von Mueller et al. | |
| 2006/0192542 A1 | 8/2006 | Uguen | |
| 2006/0223580 A1 | 10/2006 | Antonio et al. | |
| 2007/0012763 A1 | 1/2007 | Van de Velde et al. | |
| 2007/0067833 A1 | 3/2007 | Colnot | |
| 2007/0152058 A1* | 7/2007 | Yeakley | G06F 17/2247 235/462.01 |
| 2007/0168300 A1 | 7/2007 | Quesselaire et al. | |
| 2007/0194104 A1 | 8/2007 | Fukuda et al. | |
| 2007/0198436 A1 | 8/2007 | Weiss | |
| 2007/0260638 A1 | 11/2007 | Madsen et al. | |
| 2008/0091617 A1 | 4/2008 | Hazel et al. | |
| 2008/0189547 A1 | 8/2008 | Sugiyama | |
| 2008/0191845 A1* | 8/2008 | Strzelczyk | G01S 13/825 340/10.5 |
| 2008/0238679 A1 | 10/2008 | Rofougaran et al. | |
| 2008/0245851 A1 | 10/2008 | Kowalski | |
| 2008/0301030 A1 | 12/2008 | Boss et al. | |
| 2008/0301050 A1 | 12/2008 | DiGioacchino | |
| 2009/0006262 A1 | 1/2009 | Brown et al. | |
| 2009/0020602 A1* | 1/2009 | Pratone | H04W 88/02 235/380 |
| 2009/0043918 A1 | 2/2009 | Schroeder | |
| 2009/0070583 A1 | 3/2009 | von Mueller et al. | |
| 2009/0112768 A1 | 4/2009 | Hammad et al. | |
| 2009/0132852 A1 | 5/2009 | Sekiya | |
| 2009/0164326 A1 | 6/2009 | Bishop et al. | |
| 2009/0283600 A1 | 11/2009 | Chang et al. | |
| 2010/0057620 A1 | 3/2010 | Li et al. | |
| 2010/0149196 A1* | 6/2010 | Hattori | G06F 3/0482 345/520 |
| 2010/0224684 A1 | 9/2010 | Bonnin et al. | |
| 2010/0241595 A1* | 9/2010 | Felsher | G06F 19/328 705/400 |
| 2010/0243732 A1 | 9/2010 | Wallner | |
| 2010/0252624 A1 | 10/2010 | Van de Velde et al. | |
| 2010/0253482 A1 | 10/2010 | Catala Mora et al. | |
| 2010/0287339 A1* | 11/2010 | Olszewski | G06F 12/084 711/128 |
| 2010/0318468 A1 | 12/2010 | Carr et al. | |
| 2011/0060637 A1* | 3/2011 | Sakai | G06Q 30/02 705/14.26 |
| 2011/0179494 A1 | 7/2011 | Adams et al. | |
| 2011/0244799 A1 | 10/2011 | Roberts et al. | |
| 2011/0246371 A1* | 10/2011 | Puetsch | H03M 7/30 705/64 |
| 2012/0017106 A1 | 1/2012 | Curren et al. | |
| 2012/0126009 A1 | 5/2012 | Osen et al. | |
| 2012/0159207 A1 | 6/2012 | Chao et al. | |
| 2012/0166344 A1 | 6/2012 | Cheng et al. | |
| 2012/0173817 A1 | 7/2012 | Jiang et al. | |
| 2012/0185397 A1 | 7/2012 | Levovitz | |
| 2012/0215830 A1 | 8/2012 | Anguiano | |
| 2012/0226601 A1 | 9/2012 | Cole et al. | |
| 2013/0006847 A1 | 1/2013 | Hammad et al. | |
| 2013/0095755 A1 | 4/2013 | Moreton et al. | |
| 2013/0185772 A1* | 7/2013 | Jaudon | H04L 67/08 726/4 |
| 2013/0248601 A1 | 9/2013 | Liang et al. | |

(56) References Cited

U.S. PATENT DOCUMENTS

| | | | |
|---|---|---|---|
| 2013/0299574 A1 | 11/2013 | Theobald | |
| 2014/0052637 A1 | 2/2014 | Jooste et al. | |
| 2014/0067675 A1* | 3/2014 | Leyva | G06Q 20/40 705/44 |
| 2014/0127995 A1 | 5/2014 | Hendricksen et al. | |
| 2014/0138438 A1* | 5/2014 | Wakao | G06K 19/073 235/380 |
| 2014/0189359 A1 | 7/2014 | Marien et al. | |
| 2014/0217169 A1 | 8/2014 | Lewis et al. | |
| 2014/0229521 A1* | 8/2014 | Meadway | G06F 16/958 709/202 |
| 2014/0279309 A1* | 9/2014 | Cowen | G06Q 20/4016 705/30 |
| 2014/0279520 A1* | 9/2014 | Armstrong | G06Q 20/0855 705/44 |
| 2014/0289465 A1 | 9/2014 | Suduo | |
| 2014/0299664 A1 | 10/2014 | Ardis et al. | |
| 2014/0331072 A1 | 11/2014 | Osen et al. | |
| 2015/0106216 A1* | 4/2015 | Kenderov | G06Q 20/4014 705/21 |
| 2016/0117529 A1 | 4/2016 | Bedier et al. | |
| 2016/0117659 A1 | 4/2016 | Bedier et al. | |
| 2016/0117662 A1 | 4/2016 | Bedier et al. | |
| 2016/0275478 A1 | 9/2016 | Li et al. | |
| 2016/0306977 A1 | 10/2016 | Zarakas et al. | |
| 2016/0307189 A1 | 10/2016 | Zarakas et al. | |
| 2017/0004475 A1* | 1/2017 | White | G06Q 20/204 |
| 2017/0028693 A1 | 2/2017 | Free et al. | |
| 2017/0242961 A1 | 8/2017 | Shukla et al. | |
| 2018/0005243 A1* | 1/2018 | Zovi | G06Q 20/4016 |
| 2018/0115617 A1* | 4/2018 | Kalaf | G06F 16/182 |
| 2018/0189771 A1 | 7/2018 | Terra | |
| 2018/0218181 A1 | 8/2018 | Terra et al. | |
| 2018/0240103 A1 | 8/2018 | Rezayee et al. | |
| 2018/0240117 A1 | 8/2018 | Rezayee et al. | |
| 2020/0202357 A1 | 6/2020 | Rezayee et al. | |

FOREIGN PATENT DOCUMENTS

| | | |
|---|---|---|
| CA | 2 968 660 A1 | 5/2016 |
| DE | 20320080 U1 | 4/2004 |
| EP | 0 895 203 A2 | 2/1999 |
| EP | 1 431 861 A2 | 6/2004 |
| EP | 1 874 014 A2 | 1/2008 |
| FR | 2 812 744 A1 | 2/2002 |
| FR | 2 812 745 A1 | 2/2002 |
| FR | 2 834 156 A1 | 6/2003 |
| JP | H09231285 A | 9/1997 |
| JP | 2000-030146 A | 1/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 4248820 B2 | 4/2009 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |
| KR | 10-2003-0005984 A | 1/2003 |
| KR | 10-2003-0012910 A | 2/2003 |
| KR | 200333809 B1 | 11/2003 |
| KR | 10-2004-0016548 A | 2/2004 |
| KR | 100447431 B1 | 8/2004 |
| KR | 200405877 B1 | 1/2006 |
| KR | 100649151 B1 | 11/2006 |
| KR | 10-2007-0107990 A | 11/2007 |
| KR | 100842484 B1 | 6/2008 |
| RU | 2284578 C1 | 9/2006 |
| WO | 1998/012674 A2 | 3/1998 |
| WO | 2000/011624 A1 | 3/2000 |
| WO | 2000/025277 A1 | 5/2000 |
| WO | 01/01300 A1 | 1/2001 |
| WO | 2001/086599 A2 | 11/2001 |
| WO | 2002/033669 A1 | 4/2002 |
| WO | 2002/043020 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |
| WO | 2006/131708 A1 | 12/2006 |
| WO | 2009/149715 A1 | 12/2009 |
| WO | 2013/051032 A1 | 4/2013 |
| WO | 2015/001468 A1 | 1/2015 |
| WO | 2016/081804 A1 | 5/2016 |
| WO | WO-2017142851 A1 * | 8/2017 ............... G11C 8/10 |
| WO | 2018/125808 A1 | 7/2018 |
| WO | 2018/144591 A1 | 8/2018 |
| WO | 2018/156742 A1 | 8/2018 |

OTHER PUBLICATIONS

Non-Final Office Action dated Apr. 12, 2017, for U.S. Appl. No. 15/396,609, of Terra, D., filed Dec. 31, 2016.

Rueter, T., "Contactless EMV: A Work in Progress: Both EMV and contactless payment are gaining ground. Work on a single contactless EMV standard has begun, but until it is complete, the major card organizations are making their own choices", Card Technology SourceMedia, Inc (Year: 2006), pp. 1-4.

Notice of Allowance dated Mar. 26, 2019, for U.S. Appl. No. 15/396,609, of Terra, D. et al., filed Dec. 31, 2016.

Notice of Allowance dated Mar. 27, 2019, for U.S. Appl. No. 15/650,713, of Wade, J. et al., filed Jul. 14, 2017.

Notice of Allowance dated May 31, 2019, for U.S. Appl. No. 15/439,708, of Rezayee, A., et al., filed Feb. 22, 2017.

Notice of Allowance dated Nov. 15, 2018, for U.S. Appl. No. 15/824,945, of Terra, D., et al., filed Nov. 28, 2017.

Notice of Allowance dated Dec. 28, 2018, for U.S. Appl. No. 14/868,221, of Wade, J., et al., filed Sep. 28, 2015.

Notice of Allowance for Canadian Patent Application No. 2,968,660, dated Feb. 6, 2019.

Final Office Action dated Nov. 15, 2017, for U.S. Appl. No. 15/396,609, of Terra, D., filed Dec. 31, 2016.

Non-Final Office Action dated Sep. 16, 2015, for U.S. Appl. No. 14/549,338, of Lamfalusi, M.C., et al., filed Nov. 20, 2014.

Notice of Allowance dated Nov. 10, 2015, for U.S. Appl. No. 14/549,338, of Lamfalusi, M.C., et al., filed Nov. 20, 2014.

Non-Final Office Action dated Jan. 14, 2016, for U.S. Appl. No. 14/947,162, of Lamfalusi, M.C., et al., filed Nov. 20, 2015.

Notice of Allowance dated Mar. 25, 2016, for U.S. Appl. No. 14/947,162, of Lamfalusi, M.C., et al., filed Nov. 20, 2015.

Non-Final Office Action dated Aug. 25, 2016, for U.S. Appl. No. 15/220,262, of Lamfalusi, M.C., et al., filed Jul. 26, 2016.

Non-Final Office Action dated Aug. 25, 2016, for U.S. Appl. No. 15/221,383, of Lamfalusi, M.C., et al., filed Jul. 27, 2016.

Notice of Allowance dated Jan. 5, 2017, for U.S. Appl. No. 15/220,262, of Lamfalusi, M.C., et al., filed Jul. 26, 2016.

Ex Parte Quayle Action dated Jan. 26, 2017, for U.S. Appl. No. 14/967,108, of Wade, J., filed Dec. 11, 2015.

Notice of Allowance dated Mar. 22, 2017, for U.S. Appl. No. 14/967,108, of Wade, J., filed Dec. 11, 2015.

Notice of Allowance dated Apr. 21, 2017, for U.S. Appl. No. 15/221,383, of Lamfalusi, M.C., et al., filed Jul. 27, 2016.

Notice of Allowance dated Aug. 23, 2017, for U.S. Appl. No. 15/420,730, of Terra, D., et al., filed Jan. 31, 2017.

Examination Report No. 1 for Australian Patent Application No. 2017245444, dated Dec. 1, 2017.

(56) References Cited

OTHER PUBLICATIONS

Notice of Allowance dated Feb. 5, 2018, for U.S. Appl. No. 15/421,373, of Terra, D., et al., filed Jan. 31, 2017.
Examiner Requisition for Canadian Patent Application No. 2,968,660, dated Mar. 2, 2018.
Non-Final Office Action dated Jul. 19, 2018, for U.S. Appl. No. 15/824,945, of Terra, D., et al., filed Nov. 28, 2017.
Non-Final Office Action dated Jul. 26, 2018, for U.S. Appl. No. 14/868,221, of Wade, J., et al., filed Sep. 28, 2015.
Non-Final Office Action dated Aug. 13, 2018, for U.S. Appl. No. 15/396,609, of Terra, D., filed Dec. 31, 2016.
Notice of Acceptance for Australian Patent Application No. 2017245444, dated Aug. 29, 2018.
Non-Final Office Action dated Aug. 31, 2018, for U.S. Appl. No. 15/650,713, of Wade, J., filed Jul. 14, 2017.
International Search Report and Written Opinion for International Application No. PCT/US2015/061771 dated Jan. 29, 2016.
International Search Report and Written Opinion for International Application No. PCT/US2017/068220, dated Apr. 10, 2018.
International Search Report and Written Opinion for International Application No. PCT/US2018/016219, dated Apr. 30, 2018.
International Search Report and Written Opinion for International Application No. PCT/US2018/019191, dated May 30, 2018.
Non-Final Office Action dated Aug. 30, 2019, for U.S. Appl. No. 15/439,685, of Rezayee, A., et al., filed Feb. 22, 2017.
"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.
"EMBEDDED FINancial transactional IC card READer," Retrieved from the URL: https://cordis.europa.eu/project/rcn/58338/factsheet/en.
Geethapriya Venkataramani and Srividya Gopalan., "Mobile phone based RFID architecture for secure electronic payments using RFID credit cards," 2007 IEEE, (ARES'07).
"Guideline for the Use of Advanced Authentication Technology," FIPS 190, Sep. 28, 1994.
"Identification cards—Recording technique—Part 4—Location of read-only magnetic tracks—Track 1 and 2," ISO/IEC 7811-4:1995, International Organization for Standardization, Aug. 1995.
Jerome Svigals., "The Long Life and Imminent Death of the Mag-stripe Card," IEEE Spectrum, vol. 49, Issue 61, Jun. 2012.
"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing—rev1.pdf Apr. 14, 2008.
Martha E. Haykin et al., "Smart Card Technology: New Methods for Computer Access Control," NIST Special Publication 500-157, Sep. 1988.
"MSP430x1xx Family User's Guide," (including 2016 correction sheet at 2), Texas Instruments Inc., 2006.
Spegele, Joseph Brain., "A Framework for Evaluating Application of Smart Cards and Related Technology Within the Department of Defense," Naval Postgraduate School, Jan. 1995.
Stephen A. Sherman et al., "Secure Network Access Using Multiple Applications of AT&T's Smart Card," AT&T Technical Journal, Sep./Oct. 1994.
Office Action for European Patent Application No. 18709230.9, dated Jan. 31, 2020.
Office Action for European Patent Application No. 18709230.9, dated Jun. 24, 2020.
Notice of Allowance dated Nov. 29, 2019, for U.S. Appl. No. 15/439,685, of Rezayee, A., et al., filed Feb. 22, 2017.
Intention to Grant for European Patent Application No. 18709230.9, dated Sep. 2 , 2020.
Non-Final Office Action dated Nov. 27, 2020, for U.S. Appl. No. 16/810,700, of Rezayee, A., et al., filed Mar. 5, 2020.
Office Action for European Patent Application No. 17829889.9, dated Nov. 2, 2020.

\* cited by examiner

PREDICTIVE DATA OBJECT ACQUISITION AND PROCESSING

CROSS-REFERENCE TO RELATED APPLICATIONS

This application is a continuation of U.S. application Ser. No. 15/396,609, filed on Dec. 31, 2016, entitled "PARTIAL DATA OBJECT ACQUISITION AND PROCESSING," and granted as U.S. Pat. No. 10,402,816 on Sep. 3, 2019, which is incorporated herein by reference.

BACKGROUND

Electronic transaction processing systems may utilize a payment terminal. The payment terminal can include a payment reader with corresponding circuits that are used to process payment transactions and interact with payment devices such as a payment card having a magnetic strip that is swiped in a magnetic reader of the payment reader, a payment device having a Europay/Mastercard/Visa (EMV) chip that is inserted into a corresponding EMV slot of the payment reader, and near field communication (NFC) enabled devices such as a smart phone or EMV card that is tapped at the payment reader and transmits payment information over a secure wireless connection Electronic devices such as electronic cards may store information that may be used for communications and processing of transactions. For example, EMV cards may have an EMV chip located on the EMV card. The EMV chip may interface with a device such as the payment terminal or a portion thereof, which may provide a power source for the EMV chip, e.g., by connecting power and ground pins of the EMV chip to a power source and ground of the payment terminal. Once the EMV chip is connected to a power source, it may communicate with the payment reader or terminal via one or more data lines. In this manner, the EMV chip may exchange information as required to complete a transaction such as a payment transaction.

The EMV chip and payment reader or terminal may perform certain initialization steps after power is applied to the EMV chip. Once those initialization steps are complete, transactions may be performed and information such as encrypted payment information may be exchanged. In the case of payment transactions, these steps of initialization and transaction processing may take a number of seconds to complete. During this time, the EMV chip and the payment reader or terminal must remain connected in order to maintain the power and communications connections with the EMV chip. This creates delays in transaction processing time and is inconvenient for customers and merchants.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
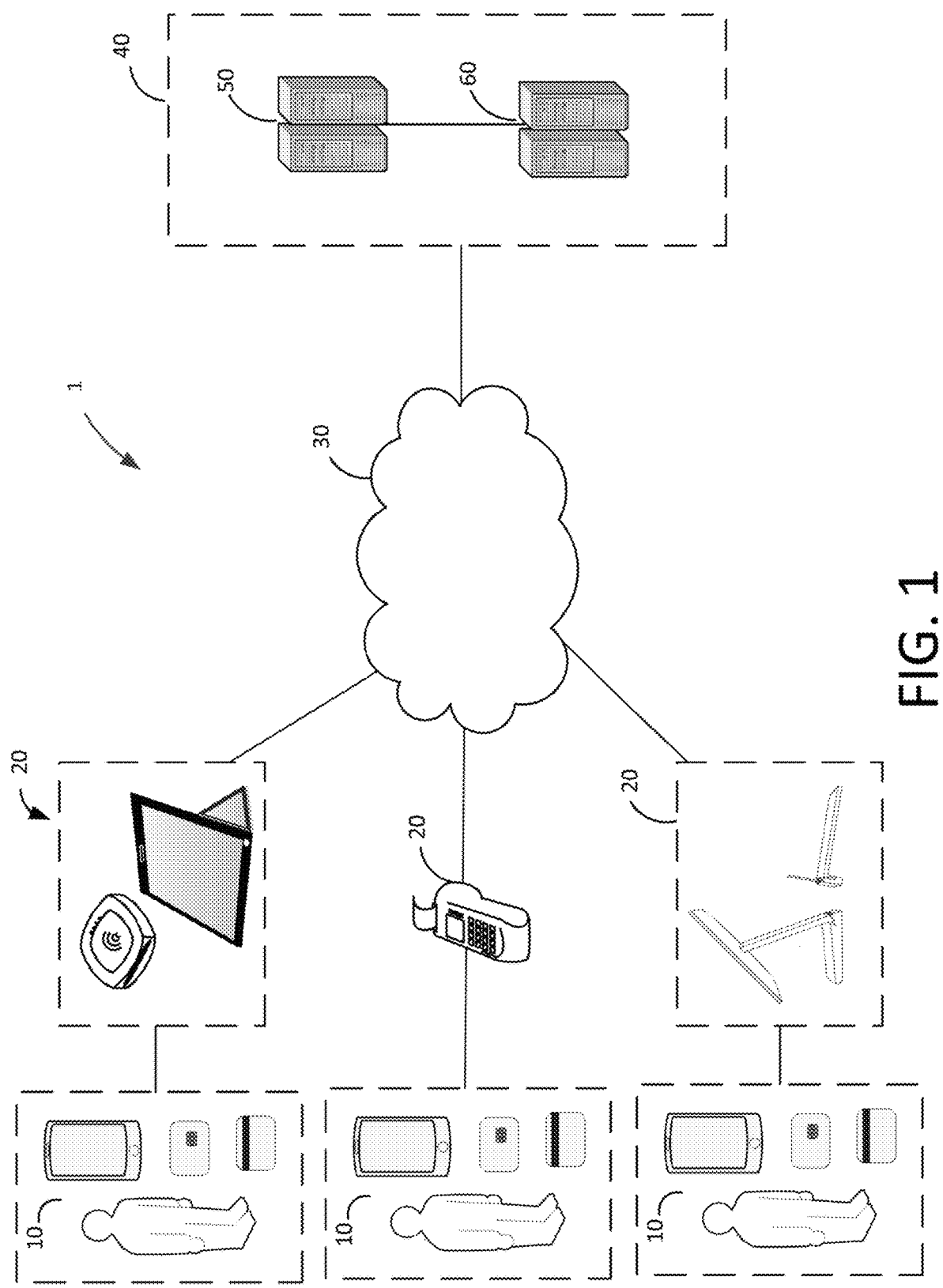
FIG. 1 shows an illustrative block diagram of a payment system in accordance with some embodiments of the present disclosure.

An electronic transaction card such as an EMV card has a chip (e.g., an EMV chip) embedded in or on the chip. The chip has contacts that can be accessed by a reader device such as a payment terminal, for example, by inserting the EMV card into an EMV slot. When properly placed in the slot, the chip contacts will physically contact corresponding contacts of the reader device. The physical contacts provide power to the chip, which in turn allows processing circuitry and memory of the EMV card to begin to function. The reader device and the EMV card then provide information to each other to initialize a communication for a transaction.

An application file locator (AFL) may be provided by the EMV card. The AFL provides information about records that are stored in memory in the EMV card, which in turn include data objects that are used to implement functionality such as EMV standard functionality, payment system functionality, and issuer-specific functionality. The AFL provides information such as a short file indicator (SFI) for the records as well as where in the EMV card memory the records may be accessed. Different card types, payment systems, and issuers not only have different records but may also have records located at disparate locations in memory and in different orders.

Reading of records from the EMV card may begin as soon as information about one or more records is known by the payment terminal. Records may be requested, data objects may be extracted from the records, and the data objects may be stored in a data object cache of the payment terminal. During processing the payment terminal will need particular data objects in order to process a transaction. The payment terminal may look for a data object in the cache in order to determine if the data object has already been received prior to the request for the particular data object. If the data object has not already been stored in the data cache, it may be determined if the location of the record that includes the data object is known or probable, for example, based on known information about particular card types, issuers, payment systems, or transactions involving other similar card characteristics. If so, a record may be read from the predicted location prior to obtaining records from other locations. If a probable location is not known or if that record request is not successful, records may be read until the desired data object is retrieved. In this manner, transaction processing may occur in parallel with reading of records from the EMV card, and in some instances, transaction processing may be completed prior to completion of the record reading process.

Information relating to record reading activities (e.g., AFL size, record sizes and locations, SFI information, record/data object associations, etc.) and information about EMV cards (e.g., issuer, payment system, card identifiers, cardholder information, etc.) may be provided by the payment terminal to one or more centralized systems (e.g., a payment service system) for analysis. This information may be analyzed to create rules for reading records from particular EMV cards and based on particular data object requests. In this manner, record reading and data object acquisition may be optimized based on information from numerous payment transactions.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a merchant device, payment reader, standalone terminal, combined customer/merchant terminals, electronic device (e.g., smart phone) running a point-of-sale application, or other electronic device that is capable of processing payment information (e.g., encrypted payment card data and user authentication data) and transaction information (e.g., purchase amount and point-of-purchase information).

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

During transactions involving an EMV card, the EMV card may be inserted into a card slot of the payment terminal. The terminal may make a number of electrical connections with the EMV card including, inter alia, a power line, ground line, and data line. The EMV card may have a processing element that is powered by the power and ground lines, and that performs various functions in conjunction with the payment terminal, such as encryption and communication of card and transaction information, for example via authorization request cryptogram (ARQC) and other transaction information. In addition, the EMV card and payment terminal exchange information that allows them to perform transaction processing, such as a process options data object list (PDOL) provided from the terminal and application interchange profile (AIP) and application file locator (AFL) provided by the EMV card.

The AFL provides a listing of files and records (e.g., application elementary files (AEF)) that are used in performing transactions. The AFL listing provides record information such as a short file identifier (SFI) for each record and a byte listing of the record locations (e.g., based on a record location). The terminal may then utilizes this information to transmit "READ RECORD" messages to the EMV card to acquire the data objects within records in the AFL. These data objects may include a variety of information, including records that are related to an EMV specification, records that are specific to a particular payment system and records that are issuer-specific.

In some embodiments, not all of the data objects may be required to process a particular transaction. However, the records that include the data objects are not necessarily located at a particular location within any one EMV card, and different transaction types, payment systems, and issuers may have different record types, sizes, locations, and applications to particular transactions. In some embodiments of the present disclosure, data objects may be requested by a first software routine (e.g., a unique set of code, subroutine, function, or any other suitable portion of software that performs a particular function) of the payment terminal as required. A second software routine may read records and store data objects within a data object cache and respond to requests from the first software routine with requested data records from the cache. In this manner, data objects may be provided on demand without acquiring all records from the EMV card. Transaction processing steps may be performed in parallel with acquisition of records, and in some instances, transactions may be completed without acquiring all records for the EMV card.

Figure 2:
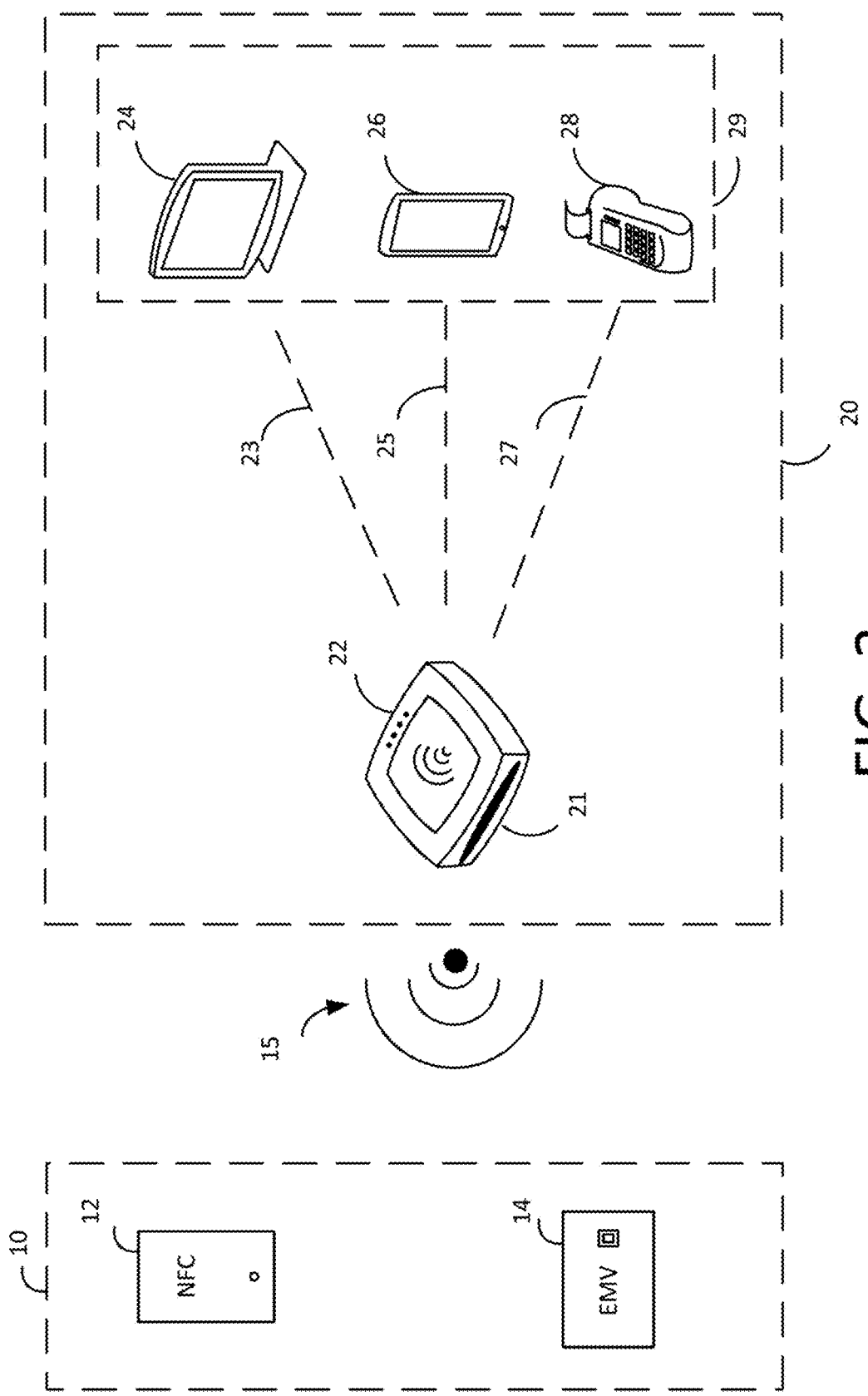
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to any suitable component of the payment terminal, such as payment reader 22. In an embodiment, the payment reader 22 of payment terminal 20 may be a device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface. In some embodiments processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
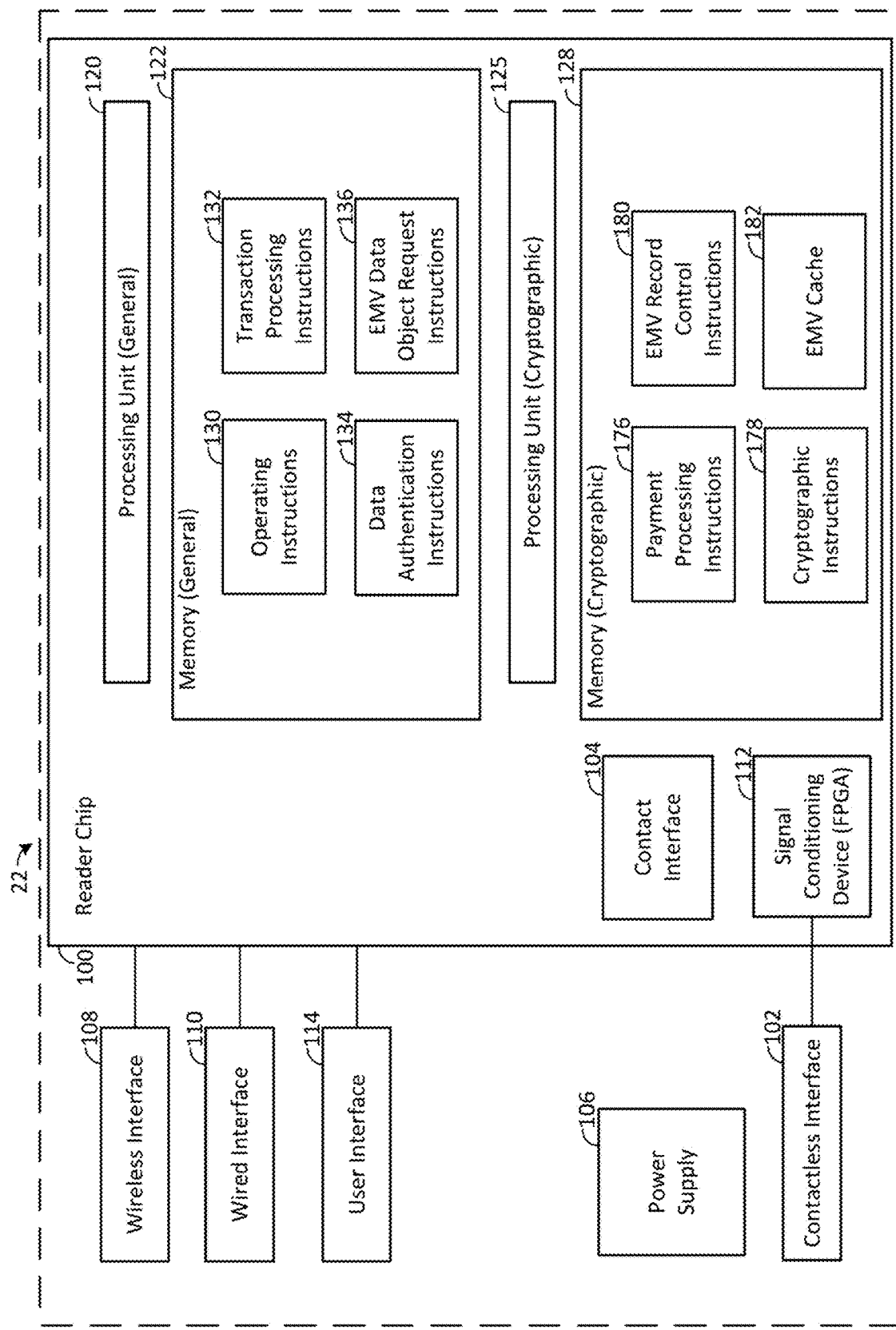
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may be a device that communicates with an interactive electronic device such as a merchant device 29, for example, using USB, Bluetooth classic, or Bluetooth low energy. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in a suitable manner. In one embodiment, payment reader 22 includes a reader chip 100, a plurality of payment interfaces (e.g., a contactless interface 102 and a contact interface 104), a power supply 106, a wireless communication interface 108, a wired communication interface 110, a signal conditioning device 112, and a user interface 114. Payment reader 22 may also include a general processing unit 120 (e.g., a terminal/reader processing unit), general memory 122, a cryptographic processing unit 125 and cryptographic memory 128. Although in one embodiment the processing units and memories will be described as packaged in a reader chip 100, and configured in a particular manner, it will be understood that general processing unit 120, general memory 122, a cryptographic processing unit 125 and cryptographic memory 128 may be configured in any suitable manner to perform the functionality of the payment reader 22 as is described herein. It will also be understood that the functionality of reader chip 100 may be embodied in a single chip or a plurality of chips, each including any suitable combination of processing units and memory to collectively perform the functionality of reader chip 100 described herein.

Processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions in any suitable number of memories and memory types. In some embodiments, processing unit 120 may have multiple independent processing units, for example a multi-core processor or other similar component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry (not depicted) such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

In an exemplary embodiment, reader chip 100 may perform functionality relating to processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 125 may have dedicated memory associated therewith (i.e., general memory 122 and cryptographic memory 128). In this manner, specific cryptographic processing and critical security information (e.g., cryptographic keys, passwords, user information, etc.), may be securely stored by cryptographic memory 128 and processed by cryptographic processing unit 125.

One or both of general processing unit 120 and cryptographic processing unit 125 of reader chip 100 may communicate with the other (e.g., processing unit 120 may communicate with cryptographic processing unit 125 and vice versa), for example, using any suitable internal bus and communication technique. In an embodiment, software routines running on each of the processing units may communicate with each other to exchange information, such as transaction processing information, requests for information, data objects, records, files, and similar information as described herein. In this manner, reader chip 100 can process transactions and communicate information regarding processed transactions (e.g., with merchant device 29).

Reader chip 100 may also include circuitry for implementing a contact interface 104 (e.g., power and communication circuitry for directly interfacing with an EMV chip of a chip card 14 that is inserted into slot 21). In some embodiments, reader chip 100 also may also include analog front end circuitry for interfacing with the analog components of contactless interface 102 (e.g., electromagnetic compatibility (EMC) circuitry, matching circuits, modulation circuitry, and measurement circuitry).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card 14 are able to exchange information such as record requests and payment information. Note that, in some embodiments, contact interface 104 may be housed on reader chip 100 and may communicate with the various components of reader chip 100 via any suitable means (e.g., a common internal bus).

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When power supply 106 includes a battery, the battery may be charged via a physical power connection, via inductive charging, or via any other suitable system. Although not depicted as physically connected to the other components of the payment reader 22 in FIG. 3, power supply 106 may supply a variety of voltages to the components of the payment reader 22 in accordance with the requirements of those components.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may include a processing unit (not depicted) and memory (not depicted).

Wired communication interface 110 may include any suitable interface for wired communication with other devices or a communication network, such as USB, Lightning, FireWire, Ethernet, any other suitable wired communication interface, or any combination thereof. In some embodiments, wired communication interface 110 may allow payment reader to communicate with one or both of merchant device 29 and payment server 40.

In some embodiments, reader chip 100 may include a signal conditioning device 112. Although signal conditioning device 112 may include any suitable hardware, software, or any combination thereof, in an exemplary embodiment signal conditioning device may comprise an FPGA. Signal condition device 112 may receive and condition signals sent from contactless interface 102, such as when a payment device 10 using NFC communication communicates with payment reader 22.

Payment reader may also include a user interface 114. User interface may provide one or more suitable systems for a user to interact with the payment reader 22, such as buttons, a touch pad, a touch screen, a microphone, a speaker, a screen, a camera, a keyboard, or any suitable combination thereof. User interface 114 may allow the user to initiate actions of the payment reader 22 (e.g., initiating a reset mode, a sleep mode, a power-down, a low-power mode, or a transaction) and to respond to requests for information from the payment reader 22.

In some embodiments, general memory 122 may be any suitable memory as described herein, and may include a plurality of sets of instructions for controlling operations of payment reader 22 and performing general transaction processing operations of payment reader 22, such as operating instructions 130, transaction processing instructions 132, data authentication instructions 134, and EMV object request control instructions 136.

Operating instructions 130 may include instructions for controlling general operations of the payment reader 22, such as internal communications, power management, processing of messages, system monitoring, sleep modes, user interface response and control, operation of the contact interface 104, the wireless interface 108, the wired interface 110, or the signal conditioning device 112, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, and invoking the various resources of reader chip 100 to process that payment information (e.g., by executing instructions stored in cryptographic memory 128 using cryptographic processing unit 125), and by generating responsive messages that are transmitted to the point-of-sale application of the merchant device 29 via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Transaction processing instructions 132 also may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with cryptographic processing unit 125 to perform most transaction processing operations, such as acquisition of records from the EMV card. In addition, transaction processing instructions 132 may provide instructions for acquiring any suitable information from a chip card (e.g., via contact interface 104 and cryptographic processing unit 125) such as authorization responses, card user name, card expiration, etc.

Data authentication instructions 134 may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 134 may include configuration instructions such as TMS-CAPK instructions. In some embodiments, the TMS-CAPK may be tailored for a particular jurisdiction (e.g., country-specific).

EMV data object request instructions 136 may comprise instructions that when executed by a processing unit (e.g., a first software routine run by the processing unit 120) may prioritize and process the acquisition and processing of EMV data objects that are obtained from an EMV card. Data objects may be required at a variety of stages of a transaction, for example, based on steps that occur within instructions such as the transaction processing instructions 132 or data authentication instructions 134. At a stage where a data object is required, the transaction processing instructions 132 or data authentication instructions 134 may request a data object or to perform operations that require access to a data object.

As described herein, data objects may be obtained from an EMV card, e.g., based on reading records stored on the EMV card. The EMV object request instructions 136 may determine that a particular data object is required (e.g., based on a specific request and/or analysis of transaction processing operations) and may execute a request to obtain the data object. In an embodiment, the request may be provided to a second software routine (e.g., EMV record control instructions 180) which may acquire the desired data object. In some embodiments, EMV object request instructions may pre-fetch data objects based on a stage in a transaction, one or more data object acquisition rules, or other information related to the transaction.

Although in the embodiment depicted in FIG. 3 the EMV data object request instructions 136 are depicted and described as being stored within memory 122 and executed by the processing unit 120, it will be understand that EMV data object request instructions may be stored at other memory (e.g., cryptographic memory 128) and executed by other processors (e.g., cryptographic processing unit 125). In a similar manner, EMV record control instructions 180 and EMV cache 182 may be stored other than at cryptographic memory 128 (e.g., at general memory 122) and may be utilized or executed at other processors (e.g., by general processing unit 120). Moreover, it will be understood that any of the instructions or cache may be stored at multiple memories, and that any of the functionality related to EMV record and data object processing described herein may be combined in any suitable manner (e.g., into a single software routine or into additional software routines).

Cryptographic processing unit 125 may be any suitable processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176, cryptographic instructions 178, and EMV record control instructions 180. In an embodiment, cryptographic memory 128 may also include an EMV cache, which may provide quickly accessible storage of information relating to the EMV card and transactions, such as EMV data objects obtained via READ RECORD requests.

Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

In an embodiment, EMV record control instructions 180 may facilitate the acquisition of records from an EMV card and the processing of requests for data objects contained in those records. EMV cache 182 may store information about data acquired from the EMV card such as AFL data, records, and data objects, as described herein. By maintaining and querying the EMV cache, and otherwise managing and prioritizing requests for data objects from other software routines of the payment reader 22, and record requests and other communications with the EMV card, EMV record control instructions may facilitate parallel processing of transactions with the accessing of records from the EMV card, and in some instances, may permit the completion of transaction processing prior to the acquisition of all records from an EMV card.

In an embodiment, processing of records and data objects as part of an initialization process after the EMV card is placed in the EMV slot. Information may be obtained from the card that relates directly to the records (e.g., AFL data) or that may be used to identify known or probable information about records (e.g., issuer, card type, cardholder, payment system, etc.). Based on this information, the EMV record control instructions may execute one or more rules to selectively obtain records from the EMV card in an expedited manner. In an embodiment, record read requests may be based in part on known or probable record locations and a known or probable ordering of data object requests. Prior to receiving an actual data object request (e.g., from EMV data object request instructions), read record requests may be made in order to obtain data object that will permit prompt processing of transactions. Any data object that is extracted from a read record may be stored in the EMV cache for future use in response to future data object requests (e.g., from EMV data object request instructions 136).

Upon receipt of a data object request (e.g., from EMV data object request instructions 136), the EMV record control instructions 180 may perform a number of steps to return the requested data object. In an embodiment, the EMV record control instructions 180 may first query the EMV cache 182 to determine whether the data object has already been obtained and stored. If not, it may be determined from the data object or other information provided with the data object (e.g., transaction processing step, etc.) whether a known or probable location of the data record within the EMV card can be identified. If such a location may be identified, the current acquisition sequence of read record requests may cease and the identified location may be queried. If the data object is located at the identified location, the data object may be provided in response to the request and stored. If the identified location does not include the data object, other high probability record locations may be searched until the data object is found. If the data object cannot be found in the EMV cache 182 or from known/probable record locations (if any exist), read records may continue to be read sequentially and stored in the EMV cache until the desired data object is found. In some embodiments, multiple data object requests may be processed simultaneously, e.g., such that multiple data object requests are being checked against newly-read records.

Figure 4:
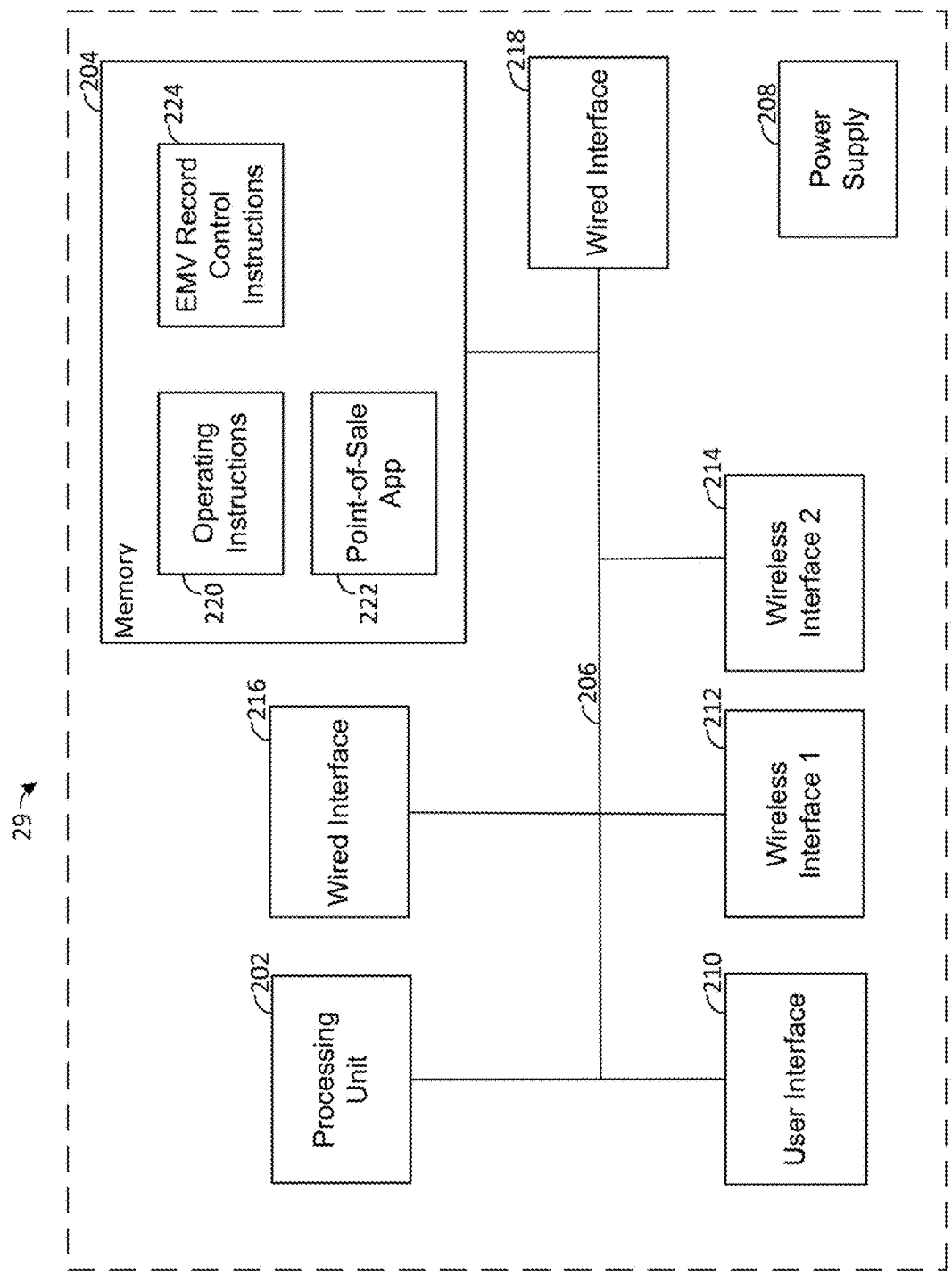
FIG. 4 depicts an illustrative block diagram of a merchant device in accordance with some embodiments of the present disclosure.

FIG. 4 depicts an exemplary merchant device 29 in accordance with some embodiments of the present disclosure. Although a merchant device 29 may be implemented in any suitable manner, in one embodiment the merchant device 29 may be an interactive electronic device that provides a user interface and communicates with one or more other devices. Examples of interactive electronic devices include tablets, smart phones, smart watches, desktop computers, laptop computers, custom electronic devices, and other suitable electronic devices having the necessary user interface and communication capabilities to perform the functions described herein.

Although particular components are depicted in a particular arrangement in FIG. 4, it will be understood that merchant device 29 may include additional components, one or more of the components depicted in FIG. 4 may not be included in merchant device 29, and the components of merchant device 29 may be rearranged in any suitable manner. In one embodiment, merchant device 29 includes a processing unit 202, a memory 204, an interface bus 206, a power supply 208, a user interface 210, a first wireless interface 212, a second wireless interface 214, and a wired interface 216.

In one embodiment, the merchant device 29 includes a processing unit 202 and memory 204 that are configured to control and perform the necessary operations of the merchant device 29. In one embodiment, the processing unit 202 may be a general purpose processor running instructions for a mobile operating system, programs, and applications based on instructions that may be stored in memory 204. The memory 204 may include any suitable memory types or combination thereof as described herein, such as ROM, flash memory, and RAM, for storing instructions and other data and providing a working memory for the execution of the operating system, programs, and applications of the merchant device 29. In one embodiment, the memory 204 may include a plurality of sets of instructions, such as operating instructions 220, point-of-sale application instructions 222, and EMV record control instructions 224.

The processing unit 202 may execute the instructions of memory 204 to interact with and control one or more other components of the merchant device 29. Although the processing unit 202 may communicate with other components of the merchant device 29 in any suitable manner, in one embodiment the processing unit may utilize an interface bus 206. Interface bus 206 may include one or more communication buses such as I2C, SPI, USB, UART, and GPIO. In one embodiment, the processing unit 202 may execute instructions of the memory and based on those instructions may communicate with the other components of the merchant device 29 via the communication buses of interface bus 206.

Merchant device 29 may also include a power supply 208. Power supply 208 may include power conversion circuitry for converting AC power and/or generating a plurality of DC voltages for use by components of merchant device 29. When power supply 208 includes a battery, the battery may be charged via a physical power connection, via inductive charging, or via any other suitable method. Although not depicted as physically connected to the other components of merchant device 29 in FIG. 4, power supply 208 may supply a variety of voltages to the components of merchant device 29 in accordance with the requirements of those components.

Merchant device 29 may also include a user interface 210. User interface 210 may provide various options for the user of the merchant device 29 to interact with applications and programs running on the merchant device 29. An exemplary user interface 210 may include hardware and software for any suitable user interface, such as a touchscreen interface, voice command interface, keyboard, mouse, gesture recognition, any other suitable user interface, or any combination thereof. In one embodiment, the user interface 210 may be a touchscreen interface that displays an interactive user interface for programs and applications such as a point-of-sale application running on the merchant device 29.

Merchant device 29 may also include a plurality of wireless communication interfaces. The wireless communication interfaces may include any suitable hardware and software for providing a wireless communication interface such as Bluetooth classic, Bluetooth low energy, WiFi, cellular, short message service (SMS), NFC, any other suitable wireless communication interface, or any combination thereof. In an embodiment, a first wireless communication interface 212 may be a wireless communication interface that primarily communicates with payment reader 22 (e.g., Bluetooth low energy interface) while a second wireless communication interface 214 may be a wireless communication interface (e.g., WiFi) that primarily communicates with a payment service system 50 of payment server 40 (e.g., via the internet).

Merchant device may also include a plurality of wired interfaces 216 and 218, which may include any suitable interface for wired communication with other devices or a communication network, such as USB, Lightning, FireWire, Ethernet, any other suitable wired communication interface, or any combination thereof. In an embodiment, wired interface 216 may primarily communicate with payment reader 22 (e.g., via USB) while wired interface 218 may primarily communicate with payment service system 50 (e.g., via Ethernet).

Operating instructions 220 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29.

Operating instructions 220 may include instructions for controlling the operations of the user interface 210. The user interface 210 may be controlled in accordance with the instructions of programs and applications of the operating instructions 220, point-of-sale application instructions 222, and EMV record control instructions 224. Operating instructions 220 may also include instructions for interacting with a payment reader 22 and for interacting with a payment service system 50 at a payment server 40. The payment reader 22 and/or the application running on the merchant device 29 may be known (e.g., via a registration process) to the payment service system 50, such that the merchant device 29 may process payments with the payment service system 50 according to the point-of-sale application instructions 222.

Point-of-sale application instructions 222 include instructions for running a point-of-sale application on the merchant device 29. When executed by the processing unit 202, the point-of-sale application instructions 222 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations.

EMV Record Control Instructions 224 may provide operations and services for assisting with the processing of data object requests for payment transactions at payment reader 22 and the intake and processing of information related to EMV card data object and record information at payment service system 50. In an integrated payment terminal (e.g., where functionality of the payment reader 22 and merchant terminal are integrated into a single device) the functionality of EMV record control instructions 224 may be integrated at the integrated payment terminal (e.g., with EMV data object request instructions 136, EMV record control instructions 180, and EMV cache 182).

In an embodiment, EMV record control instructions 224 may assist with data object and record requests during payment transactions. Aspects of the processing described for payment reader 22 (e.g., aspects of EMV data object request instructions 136, EMV record control instructions 180, and EMV cache 182) may be offloaded to merchant terminal 29. EMV record control instructions 224 may assist with predictive requesting of data objects or records, execution of rules for identifying record rules, and parallel processing of payment transaction steps.

In an embodiment, EMV record control instructions 224 may provide local processing to modify or create record and data object processing rules. As described in more detail with respect to the operations of payment service system 50, data from numerous payment transactions may be aggregated and analyzed to generate rules for predictive requests of data objects, predictive requests of records, identification of known or probable record locations, parallelization of transaction processing steps, and similar functionality to expedite the process of acquiring data objects and processing payment transactions based on the acquired data objects. A particular merchant terminal 29 may receive information from a limited number of sources (e.g., a limited subset of payment readers 22 that connect to the merchant device 29, other merchant devices on shared networks, other merchant devices operated by the same entity, etc.). That limited information may be used to generate independent local rules (e.g., without regard to whether any rules are received from payment service system 50), or in some embodiments, modifications to global rules received from payment service system 50).

In an exemplary local rule, the merchant devices may operate in a particular locality where a large percentage of EMV cards have records located at particular locations, or where only a limited number of card types with particular record locations are used. Local rules may be created that that prioritize record searches based on these locations, and may supplement or displace global rules.

In another exemplary local rule, merchants may have customer information (e.g., from loyalty programs, etc.) that may identify customers and associate customers with known record locations. In this manner, a library of payment cards and record locations may be pre-loaded once a customer is identified. In an embodiment, customers may be identified by merchant biometric or monitoring systems (e.g., facial recognition, morphology, RFID devices, WiFi connections, GPS, cellular data, etc.) upon entering a queue, merchant location, or proximity to a merchant location, such that record location information may be identified and pre-loaded for the particular customer.

EMV record control instructions 224 may also provide data to the payment service system 50 from payment reader 22. This information may include data record locations, card information, customer information, data object-record associations, utilization of records and data objects in processing payment transactions (e.g., identification of records that include data objects that are frequently or infrequently used in payment transactions), and other similar information. This information may be forwarded to the payment service system, and in some embodiments, additional information may be appended. The additional information may be any suitable information that may be acquired by the merchant terminal, such as customer information, customer preference information, geographic information, store-specific information, purchased items, etc.

EMV record control instructions 224 may also facilitate updates to the EMV data object request instructions 136, EMV record control instructions 180, and EMV cache 182. In some embodiments, EMV record control instructions 224 may modify firmware updates received from payment service system 50 based on local rules.

Figure 5:
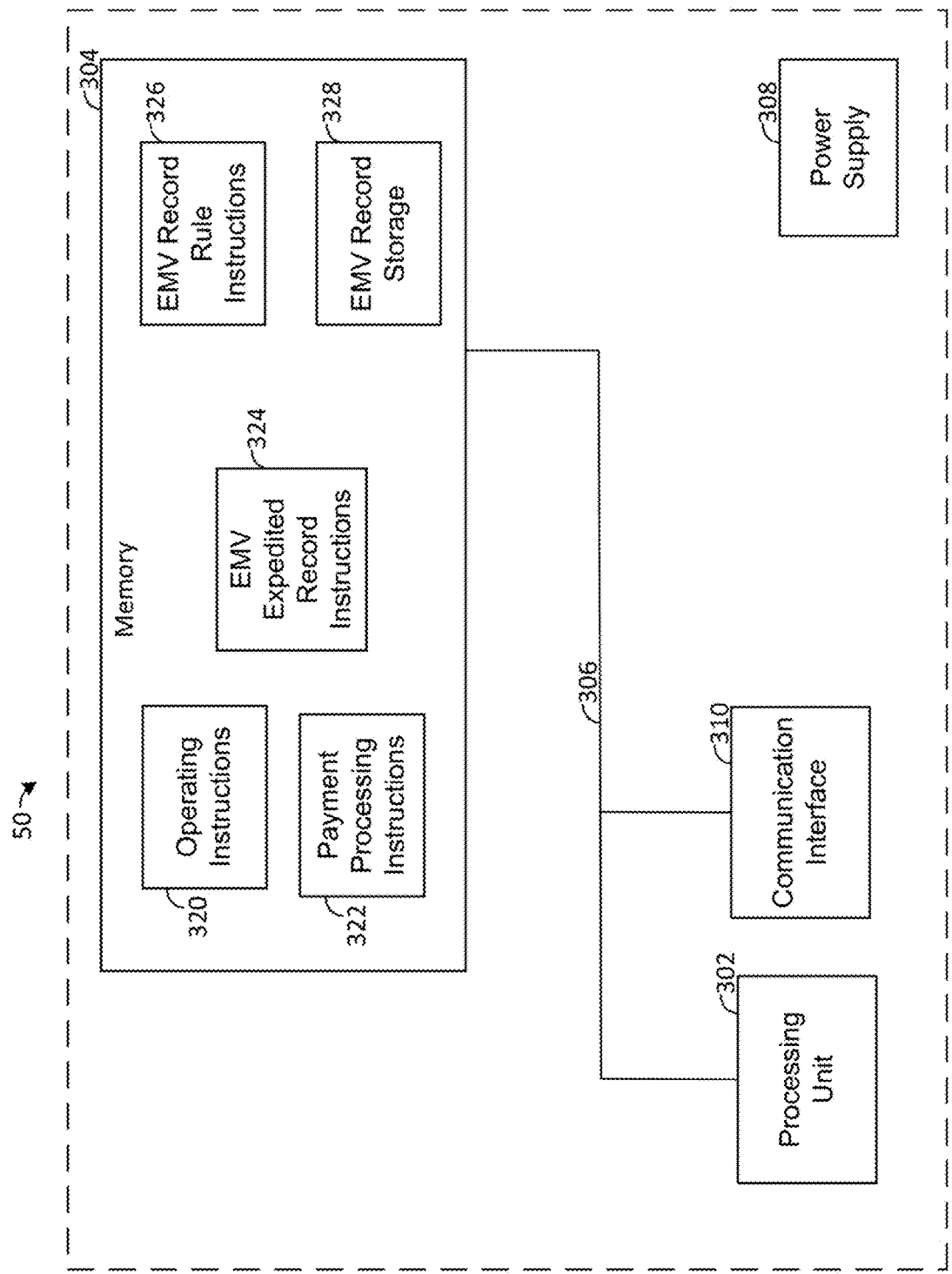
FIG. 5 depicts an illustrative block diagram of a payment service system in accordance with some embodiments of the present disclosure.

FIG. 5 depicts an exemplary payment service system 50 of a payment server 40 in accordance with some embodiments of the present disclosure. Although the payment service system 50 is depicted as a single server, it will be understood that the operations and memory of the payment service system 50 may be distributed over any suitable number of servers. Although particular components are depicted in a particular arrangement in FIG. 5, it will be understood that the payment service system 50 may include additional components, one or more of the components depicted in FIG. 5 may not be included in the payment service system 50, and the components of payment service system 50 may be rearranged in any suitable manner. It will also be understood that, in some embodiments, payment service system 50 may include the necessary components and have the necessary configuration to perform any of the functionality attributed to the payment server 40 herein. In one embodiment, payment service system 50 includes at least a processing unit 302, a memory 304, an interface bus 306, a power supply 308, and a communication interface 310.

In one embodiment, the payment service system 50 includes a processing unit 302 and memory 304 that are configured to control and perform the necessary operations of the payment service system 50. In one embodiment, the processing unit 302 of may be a high-speed processor running instructions for an operating system for the server, programs, and applications based on instructions that may be stored in memory 304. The memory 304 may include any suitable memory types or combination thereof as described herein for storing instructions and other data and providing a working memory for the execution of the operating system, programs, and applications of the payment service system 50. In one embodiment, the memory may include a plurality of sets of instructions, including but not limited to operating instructions 320, payment processing instructions 322, EMV expedited record instructions 324, and EMV record rule instructions 326. Memory 304 may also include EMV record storage 328, which may provide for storage of information relating to EMV records (e.g., from an AFL) as well as rules and related information to assist and expedite the processing of records.

The processing unit 302 may execute the instructions of memory 304 to interact with and control one or more other components of the payment service system 50. Although the processing unit 302 may communicate with other components of the payment service system 50 in any suitable manner, in one embodiment the processing unit 302 may utilize an interface bus 306. Interface bus 306 may include one or more communication buses such as I2C, SPI, USB, UART, and GPIO. In one embodiment, the processing unit 302 may execute instructions of the memory 304 and based on those instructions may communicate with the other components of the payment service system 50 via the communication buses of interface bus 306.

The payment service system 50 may also include a power supply 308. Power supply 308 may include power conversion circuitry for converting AC power and/or generating a plurality of DC voltages for use by components of the payment service system 50. In some embodiments, power supply 308 may include a backup system such as a battery backup, to avoid interruptions in service during power outages. Although not depicted as physically connected to the other components of the payment service system 50 in FIG. 5, power supply 308 may supply a variety of voltages to the components of the payment service system 50 in accordance with the requirements of those components.

The payment service system 50 may also include a communication interface 310. Although communication interface 310 may include any suitable communication interface or combination thereof, in some embodiments, the communication interface 310 may utilize higher speed communication interfaces such as WiFi, cellular, Ethernet, or fiber optics. The communication interface 310 may establish a secured connection (e.g., via TLS or SSL) with a payment terminal 20 (e.g., payment reader 22 via merchant device 29) in order to exchange messages relating to transactions to be processed, record acquisition and processing, firmware updates, application updates, etc. The communication interface 310 may also communicate with other servers of the payment server 40 such as payment servers, which may, in some embodiments, be located remotely from the payment service system 50 and operated by different entities than those that control the payment service system 50. For example, in one embodiment, the payment service system 50 may be operated by an entity that provides one or more of the payment reader 22, merchant device 29, or point-of-sale application 222. Payment servers may be associated with and operated by one or more of the merchant, issuer, or customer banks.

Memory 304 may include a plurality of data stores and a plurality of sets of instructions for performing the processing operations of the payment service system 50, such as operating instructions 320, payment instructions 322, EMV expedited record instructions 324, EMV record rule instructions 326, EMV record storage 328, and other suitable instructions and data stores for use in operating the payment service system 50 (e.g., instructions related to the operation of one or more other applications or components of the payment service system 50).

Operating instructions 320 may include instructions for controlling suitable general operations of the payment service system 50, such as internal communications, power management, control of communication devices, control of other hardware of the payment service system 50, any other suitable instructions, or any combination thereof. In one embodiment, the operating instructions may provide instructions for the operating system of the payment service system 50 as well as most drivers, programs, and applications operating on the payment service system 50.

Operating instructions 320 may also include instructions for interacting with a merchant device 29. In one embodiment, the payment service system 50 may communicate with the merchant device 29 via the communication interface 310. Operating instructions 320 may include instructions that when executed by processing unit 302 control these communications and provide for secure communication by implementing procedures such as TLS, SSL or as encrypted data based on keys.

Payment processing instructions 322 include instructions for processing payments, and may control the content of messages that are communicated to the merchant device 29, payment reader 22 (e.g., via merchant device 29), and/or payment servers. In one embodiment, the payment processing instructions may include information about each payment reader 22 and merchant device 29 having an installed point-of-sale application 222. In addition to performing payment processing functions such as providing payment information such as amount and a credit card number to a transaction processing system and communicating responses back to the merchant, the payment service system 50 may also perform complex analysis of merchant data that may be used to provide reports, metrics, or other data to a merchant (e.g., a merchant operating a plurality of merchant devices 29 at a plurality of locations). Payment processing instructions 322 may also include instructions for accessing encryption keys such as a shared private key or a key of a public/private key pair for encrypting and decrypting data provided by one or more of a payment device 10, payment reader 22, or merchant device 29.

EMV record storage 328 may provide a repository for storage of information relating EMV transactions, EMV record and data object processing rules, and other related data. In an embodiment, the stored data and include information relating to record locations from transactions for payment readers that are in communication with the payment service system, data object utilization information for such transactions, related transaction information (e.g., payment system information, issuer information, etc.), store and customer information (e.g., provided by merchant terminals), other suitable data, and associations therebetween. The stored data may also include rules for processing transactions based on such information, which may be organized for selection based on global, national, and local factors, e.g., to determine which record and data object processing rules should be provided to which merchant terminals and payment readers. In an exemplary embodiment, rules may be targeted based on information such as updates to EMV cards, merchant type, particular merchants, locality, customer demographics, etc., that may be associated with particular known or probable record locations and data object utilization.

EMV expedited record instructions 324 may assist with data object and record requests during payment transactions with connected payment terminals. Aspects of the processing described for payment reader 22 (e.g., aspects of EMV data object request instructions 136, EMV record control instructions 180, and EMV cache 182) and/or merchant terminal 29 (e.g., EMV record control instructions 224) may be offloaded to the payment service system 50. EMV expedited record instructions 324 may assist with predictive requesting of data objects or records, execution of rules for identifying record rules, parallel processing of payment transaction steps, and identification of information that may be used to determine likely record locations and data object utilization (e.g., customer information, etc.).

EMV record rule instructions 326 may provide for the creation, association, and storage of rules for processing or records and data objects. As described herein, information may be provided from a variety of sources that may be determined to be associated with known or probable record locations and data object utilization. Payment service system may receive this information for a very large number of transactions on a daily basis, from a very large number of merchants and payment terminals. This data may be analyzed using a variety of techniques (e.g., supervised or unsupervised machine learning) in order to identify rules for identifying record locations and transaction/data object processing steps and sequences. These rules may be hierarchical such that global rules may apply to large categories of payment terminals, with numerous levels of modification and refinement applying to particular sub-categories such as merchant type, location, customer demographics, issuer frequency, payment system frequency, etc. EMV record rule instructions may provide for the generation of software updates that may be provided to payment terminals, e.g., to update instructions and stored record and data object information.

Figure 6:
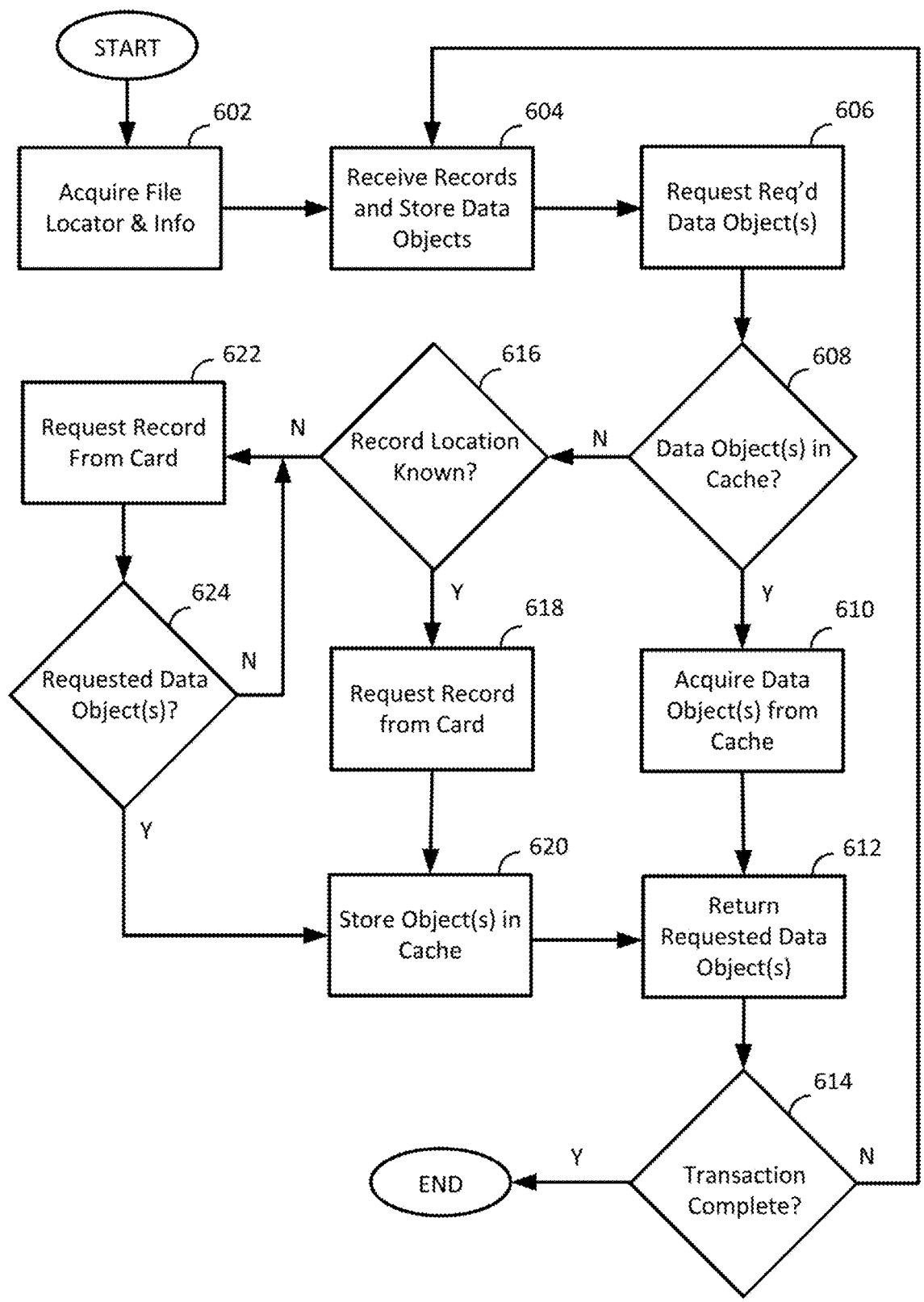
FIG. 6 depicts a non-limiting flow diagram illustrating exemplary steps for partial processing of data objects from a EMV card at a payment reader in accordance with some embodiments of the present disclosure.
Figure 7:
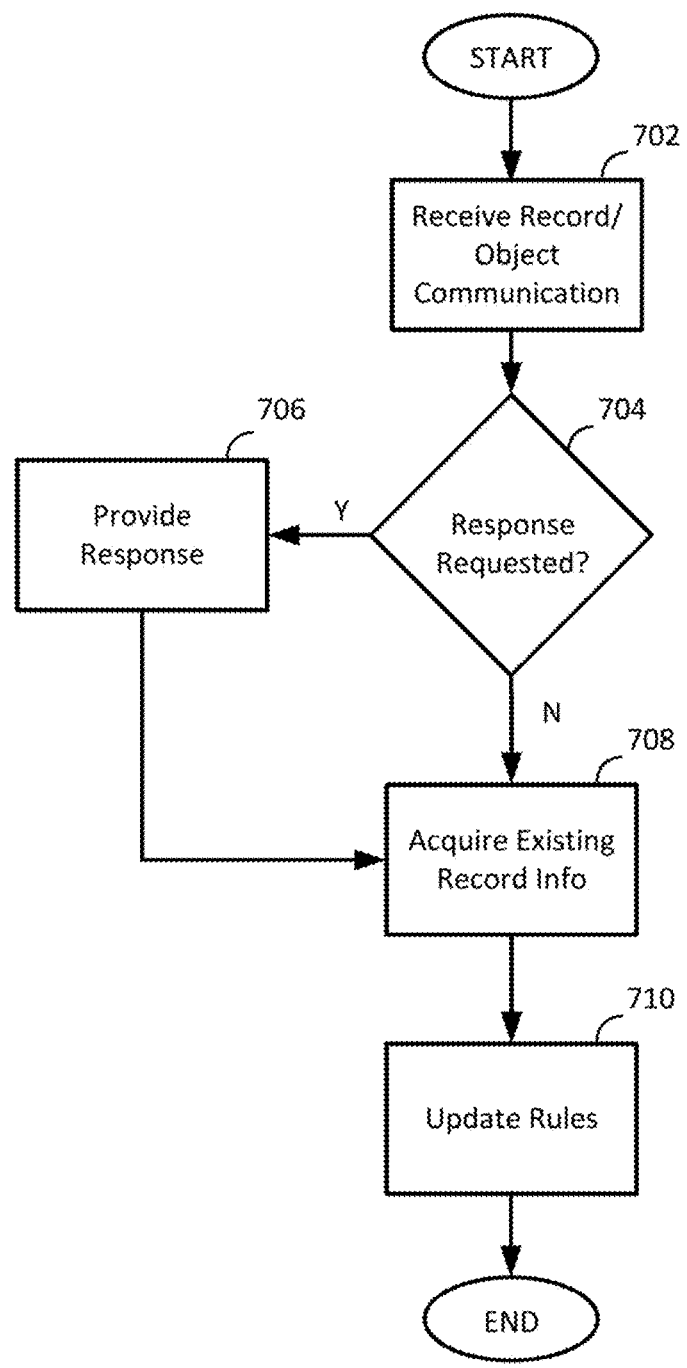
FIG. 7 depicts a non-limiting flow diagram illustrating exemplary steps for server-assisted partial processing of data objects from an EMV card in accordance with some embodiments of the present disclosure.

In view of the structures and devices described supra, methods that can be implemented in accordance with the disclosed subject matter will be better appreciated with reference to the flowcharts of FIGS. 6-7. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts a non-limiting flow diagram illustrating exemplary steps for partial processing of data objects from an EMV card at a payment reader in accordance with some embodiments of the present disclosure.

Processing of FIG. 6 may start at step 602 by acquiring the file locator and other information useful in identifying record locations and data object utilization. As described herein, certain information may be received from sources other than the EMV card (e.g., based on customer information). Once the EMV card is inserted at the payment terminal (e.g., at payment reader 22), information such as the AFL and other identifying card information may be acquired from the EMV card. If available, information relating to known or probable record locations may be acquired based on the received information. Although not depicted in FIG. 6, additional information may be acquired from the EMV card or other sources throughout the transaction, which may be used to update known or probable record location and data object utilization information. Once information has been received and processed at step 602, processing may continue to step 604.

At step 604, records may be requested from the EMV card. As described herein, the received AFL information and known or probable record locations may be used to sequence and generate read record requests for particular storage locations within the EMV card. As record requests are received, the records and/or data objects may be stored within the EMV cache. This processing may continue until a transaction begins, at which time processing may continue to step 606.

At step 606, one or more data objects may be requested (e.g., by a first software routine of EMV data object request instructions 136) for use in processing a payment transaction. In some embodiments, sequencing of requests may be determined based on record and data object processing rules in a manner that facilitates parallel processing of payment transactions while data objects and records are being acquired, as described herein. Once the request for one or more data objects is received, processing may continue to step 608.

At step 608, the EMV cache may be queried (e.g., by a second software routine of EMV record control instructions 180) to determine whether requested data objects are located in the EMV cache. If the data records are available from the cache, processing may continue to steps 610. If the data records are not available from the EMV cache, processing may continue to step 616.

At step 610, the data records are acquired from the EMV cache (e.g., by the second software routine of EMV record control instructions 180). Once the data object has been acquired, processing may continue to step 612, at which the data object is returned for transaction processing (e.g., to the first software routine of EMV data object request instructions 136). Processing may then continue to step 614.

At step 614, it may be determined that no additional data objects are required to complete the transaction. If no additional data objects are required, processing may end. If additional data objects may be required, processing may return to step 604 at which additional records may be requested and data objects stored.

At step 616, it may be determined (e.g., by the second software routine of EMV record control instructions 180) whether the location of the record or records that are associated with the requested data object is known. If the location is known, processing may continue to step 618. If the location of the associated record is not known, processing may continue to step 622.

At step 618, a read record request may be provided to the EMV card, based on the known location of the record in the storage of the EMV card. Once the requested record is returned, processing may continue to step 620.

At step 620, the received record may be processed and the record and/or data object may be stored at the EMV cache for future use. Processing may then continue to steps 612 and 614, at which the data object is returned and it is determined whether any additional data objects are required to complete the transaction.

At step 622, a read record request may be provided to the EMV card. In some embodiments, the read record request may be based on one or more known probable locations of the record that is associated with the requested object, such that read record requests may be prioritized for that location. The requested record may be received and the data object of the request may be extracted. Processing may then continue to step 624.

At step 624, it may be determined whether the data object acquired at step 622 corresponds to the requested data object from step 606. If the desired data object was not received, processing may return to step 622 to request additional records. If the desired data object was returned, processing may continue to step 620, at which the data object is stored in the EMV cache, step 612, at which the requested data object is returned for use in transaction processing, and step 614 in which it is determined whether any additional data objects are required to complete the transaction.

FIG. 7 depicts a non-limiting flow diagram illustrating exemplary steps for server-assisted partial processing of data objects from an EMV card in accordance with some embodiments of the present disclosure. The steps of FIG. 7 may be performed by suitable computing devices and/or software modules that are in communication with device and/or software modules that read records, extract data objects, and process payment transactions based on those data objects. In exemplary embodiments, the processing steps of FIG. 7 may be performed by a merchant device, a payment service system, or a combination thereof.

Processing may begin at step 702, at which a communication regarding a record and/or data object may be received. As described herein, various information may be communicated regard records and data objects, such as requests to assist in processing (e.g., to identify likely record locations or data object utilization information), data record and object information for analysis, and information associated with records and objects that may be analyzed to identify rules for processing of records and data objects. Once the communication is received, processing may continue to step 704.

At step 704, it may be determined whether the communication requires a response. If a response is required, processing may continue to step 706. If a response is not required, processing may continue to step 708.

At step 706, the response to the communication may be identified and transmitted. In some embodiments, the response may include information such as a record location to request, a sequence of read record requests, a data object to request, a sequence of data object requests, a sequence of transaction processing steps, software updates, and/or libraries of known record locations for reference at the transaction processing device. Once the response is transmitted, processing may continue to step 708.

At step 708, existing record information may be acquired for analysis. As described herein, EMV record storage may include information about records, data objects, rules related to these records and data objects, and other information that may be used to develop those rules. Existing information may include the raw data, existing rules, data models, and/or other suitable information. Once the existing record information is acquired, processing may continue to step 710.

At step 710, the rules may be updated based on information in the newly received communication. As described herein, a hierarchy of rules may be provided and updated based on newly acquired information. In some embodiments, updates may be performed at different intervals (e.g., periodically) and/or based on a quantity or type of acquired data (e.g., based on a certain volume of new data being acquired). Once the rules are updated, the processing of FIG. 7 may end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for an EMV card reader to predictively acquire data objects from an electronic payment chip of an EMV card, the method comprising:
   establishing a data connection between the EMV card reader and the electronic payment chip;
   receiving, at the EMV card reader from the electronic payment chip, identifying information for the EMV card;
   determining, at the EMV card reader based on the identifying information, predicted record locations for a plurality of data records within a memory of the electronic payment chip, wherein one or more data objects are stored within the plurality of data records;
   associating, at the EMV card reader based on the identifying information, one or more data objects with the predicted record locations;
   identifying, at the EMV card reader, a desired data object for processing;
   determining, by the EMV card reader, a first predicted record location based on the desired data object and the association between the one or more data objects and the predicted record locations;
   requesting, by the EMV card reader from the electronic payment chip, a first data record at the first predicted record location;
   accessing, by the EMV card reader, a first data object from the first data record;
   processing, by the EMV card reader, a first payment transaction based on the first data object;
   transmitting, by the EMV card reader, the identifying information and the first data object to a payment service system;
   analyzing, by the payment service system, the identifying information and the first data object from the EMV card reader, additional identifying information received from additional EMV card readers, and additional data objects received from the additional EMV card readers to generate one or more rules to identify predicted record locations and data objects;
   modifying, by the payment service system, the association between one or more data objects and the predicted record locations based on the generated one or more rules;
   receiving, at the EMV card reader, the modified association between one or more data objects and the predicted record locations from the payment service system; and
   processing, at the EMV card reader, additional payment transactions based on the modified association.

2. The method of claim 1, wherein the identifying information comprises an application file locator.

3. The method of claim 1, further comprising:
   identifying, at the EMV card reader, a second data object for processing;
   determining, by the EMV card reader, a second predicted record location based on the second data object and the association between the one or more data objects and the predicted record locations;
   requesting, by the EMV card reader from the electronic payment chip, a second data record at the second predicted record location;
   accessing, by the EMV card reader, the second data object from the second predicted data record; and
   processing, by the EMV card reader, the first payment transaction based on the second data object.

4. The method of claim 1, further comprising:
   determining, by the EMV card reader, that the first data object does not correspond to the desired data object;
   requesting, by the EMV card reader from the electronic payment chip, a second data record from a second predicted data location;
   accessing, by the EMV card reader, a second data object from the second data record;
   determining, by the EMV card reader, that the second data object corresponds to the desired data object; and
   processing, by the EMV card reader, the first payment transaction based on the desired data object.

5. A method for a transaction processing device to acquire data objects from an electronic transaction chip of an electronic transaction card, the method comprising:
   establishing a data connection between the transaction processing device and the electronic transaction chip;
   receiving, at the transaction processing device from the electronic transaction chip, identifying information for the electronic transaction card;
   associating, at the transaction processing device based on the identifying information, a plurality of data objects associated with processing payment transactions with predicted data locations within a memory of the electronic transaction chip storing the plurality of data objects;
   identifying, at the transaction processing device, a desired data object, from the plurality of data objects, required for processing a payment transaction at the transaction processing device;
   determining, by the transaction processing device, a predicted data location within the memory of the electronic transaction chip for the desired data object based on the association between the plurality of data objects and the predicted data locations;
   acquiring, by the transaction processing device, the desired data object from the predicted data location within memory of the electronic transaction chip and storing the desired data object in a cache of the transaction processing device prior to a request for the desired data object during processing of the payment transaction by the transaction processing device; and
   processing, by the transaction processing device, the payment transaction based on the desired data object that is retrieved from the cache of the transaction processing device during processing of the payment transaction.

6. The method of claim 5, wherein the identifying information comprises an application file locator.

7. The method of claim 5, wherein acquiring the desired data object comprises:
   requesting, by the transaction processing device from the electronic transaction chip, first data at the predicted data location; and
   accessing, by the transaction processing device, the desired data object from the first data.

8. The method of claim 5, further comprising transmitting, by the transaction processing device, the identifying information and the desired data object to a payment service system, wherein the payment service system modifies the association between the plurality of data objects and the predicted data locations based on the identifying information, the desired data object, additional identifying information received from additional transaction processing devices, and additional data objects received from the additional transaction processing devices.

9. The method of claim 8, further comprising:
receiving, at the transaction processing device, the modified association between the plurality of data objects and the predicted data locations; and
processing, at the transaction processing device, additional payment transactions based on the modified association.

10. The method of claim 5, further comprising:
identifying, at the transaction processing device, a second data object from the plurality of data objects for processing;
determining, by the transaction processing device, a second predicted data location based on the second data object and the association between the plurality of data objects and the predicted data locations;
requesting, by the transaction processing device from the electronic transaction chip, second data at the second predicted data location;
accessing, by the transaction processing device, the second data object from the second data; and
processing, by the transaction processing device, the payment transaction based on the second data object.

11. The method of claim 5, wherein acquiring the desired data object comprises:
requesting, by the transaction processing device from the electronic transaction chip, first data at the predicted data location;
accessing, by the transaction processing device, a first data object from the first data;
determining, by the transaction processing device, that the first data object does not correspond to the desired data object;
requesting, by the transaction processing device from the electronic transaction chip, second data at a second predicted data location;
accessing, by the transaction processing device, a second data object from the second data; and
determining, by the transaction processing device, that the second data object corresponds to the desired data object.

12. The method of claim 5, wherein:
determining the predicted data location within memory of the electronic transaction chip for the desired data object includes identifying, by the transaction processing device, a desired plurality of data portions based on which of the predicted data locations corresponds to the desired data object; and
acquiring the desired data object includes:
acquiring, by the transaction processing device from the electronic transaction chip, the desired plurality of data portions; and
accessing, by the transaction processing device, the desired data object from the desired plurality of data portions.

13. The method of claim 12, wherein the plurality of data portions comprise a first plurality of data portions for EMV standard functionality, a second plurality of data portions for payment system functionality, and a third plurality of data portions for issuer-specific functionality, and wherein identifying, by the transaction processing device, the desired plurality of data portions comprises determining which of the first plurality of data portions, second plurality of data portions, or third plurality of data portions corresponds to the desired data object.

14. A system for processing transactions with an electronic transaction chip of an electronic transaction card, the system comprising:
an input/output connection to communicate with the electronic transaction chip;
a processor coupled to the input/output connection to send and receive communications with the electronic transaction chip;
memory comprising instructions stored thereon, the processor coupled to the memory to execute the instructions to:
establish a data connection with the electronic transaction chip;
receive, from the electronic transaction chip, identifying information for the electronic transaction card;
associate, based on the received identifying information, a plurality of data objects associated with processing payment transactions with predicted data locations within a memory of the electronic transaction chip storing the plurality of data objects;
identify a desired data object, from the plurality of data objects, required for processing a payment transaction;
determine a predicted data location within the memory of the electronic transaction chip for the desired data object based on the association between the plurality of data objects and the predicted data locations;
acquire the desired data object from the predicted data location within memory of the electronic transaction chip;
store the desired data object in a cache prior to a request for the desired data object during processing of the payment transaction; and
process the payment transaction based on the desired data object that is retrieved from the cache.

15. The system of claim 14, wherein the identifying information comprises an application file locator.

16. The system of claim 14, wherein, to acquire the desired data object, the instructions cause the processor to:
request from the electronic transaction chip first data at the predicted data location; and
access the desired data object from the first data.

17. The system of claim 14, further comprising a communication interface, and wherein the instructions further cause the processor to transmit, via the communication interface, the identifying information and the desired data object to a payment service system, wherein the payment service system modifies the association between the plurality of data objects and the predicted data locations based on the identifying information, the desired data object, additional identifying information received from additional transaction processing devices, and additional data objects received from the additional transaction processing devices.

18. The system of claim 17, wherein the instructions further cause the processor to:
receive, via the communication interface, the modified association between the plurality of data objects and the predicted data locations; and
process additional payment transactions based on the modified association.

19. The system of claim 14, wherein the instructions further cause the processor to:
identify a second data object for processing;
determine a second predicted data location based on the second data object and the association between the plurality of data objects and the predicted data locations;
request second data at the second data location;
access the second data object from the second data; and process the payment transaction based on the second data object.

20. The system of claim 14, wherein, to acquire the desired data object, the instruction further cause the processor to:
request, from the electronic transaction chip, first data at the predicted data location;
access a first data object from the first data;
determine that the first data object does not correspond to the desired data object;
request, from the electronic transaction chip, second data at a second predicted data location;
access a second data object from the second data; and
determine that the second data object corresponds to the desired data object.

21. The system of claim 14, wherein:
to determine the predicted data location within memory of the electronic transaction chip for the desired data object, the instructions cause the processor to identify a desired plurality of data portions based on which of the predicted data locations corresponds to the desired data object; and
to acquire the desired data object, the instructions cause the processor to:
acquire, from the electronic transaction chip, the desired plurality of data portions; and
access the desired data object from the desired plurality of data portions.

22. The system of claim 21, wherein the plurality of data portions comprise a first plurality of data portions for EMV standard functionality, a second plurality of data portions for payment system functionality, and a third plurality of data portions for issuer-specific functionality, and wherein the identification of the desired plurality of data portions comprises a determination of which of the first plurality of data portions, second plurality of data portions, or third plurality of data portions corresponds to the desired data object.

23. A non-transitory computer-readable storage medium comprising instructions stored therein, which when executed by one or more processors, cause the one or more processors to perform operations comprising:
establishing a data connection with an electronic transaction chip of an electronic transaction card;
receiving, from the electronic transaction chip, identifying information for the electronic transaction card;
associating, based on the identifying information, a plurality of data objects associated with processing payment transactions with predicted data locations within a memory of the electronic transaction chip storing the plurality of data objects;
identifying a desired data object, from the plurality of data objects, required for processing a payment transaction;
determining a predicted data location within the memory of the electronic transaction chip for the desired data object based on the association between the plurality of data objects and the predicted data locations;
acquiring, from the electronic transaction chip, the desired data object from the predicted data location within memory of the electronic transaction chip;
store the desired data object in a cache of the transaction processing device prior to a request for the desired data object during processing of the payment transaction; and
processing the payment transaction based on the desired data object that is retrieved from the cache.

24. The non-transitory computer-readable storage medium of claim 23, wherein the identifying information comprises an application file locator.

25. The non-transitory computer-readable storage medium of claim 23, wherein acquiring the desired data object comprises:
requesting, from the electronic transaction chip, first data at the predicted data location; and
accessing the desired data object from the first data.

26. The non-transitory computer-readable storage medium of claim 23, wherein the instructions further comprise instructions that cause the one or more processors to perform operations comprising transmitting the identifying information and the desired data object to a payment service system, wherein the payment service system modifies the association between the plurality of data objects and the predicted data locations based on the identifying information, the desired data object, additional identifying information received from additional transaction processing devices, and additional data objects received from the additional transaction processing devices.

27. The non-transitory computer-readable storage medium of claim 26, wherein the instructions further comprise instructions that cause the one or more processors to perform operations comprising:
receiving the modified association between the plurality of data objects and the predicted data locations; and
processing additional payment transactions based on the modified association.

28. The non-transitory computer-readable storage medium of claim 23, wherein the instructions further comprise instructions that cause the one or more processors to perform operations comprising:
identifying a second data object for processing;
determining a predicted second data location based on the second data object and the association between the plurality of data objects and the predicted data locations;
requesting, from the electronic transaction chip, second data at the second predicted data location;
accessing the second data object from the second data; and
processing the payment transaction based on the second data object.

29. The non-transitory computer-readable storage medium of claim 23, wherein acquiring the desired data object comprises:
requesting, from the electronic transaction chip, first data at the predicted data location;
accessing a first data object from the first data;
determining that the first data object does not correspond to the desired data object;
requesting, from the electronic transaction chip, second data from a second predicted data location;
accessing a second data object from the second data; and
determining that the second data object corresponds to the desired data object.

30. The non-transitory computer-readable storage medium of claim 23, wherein:
determining the predicted data location within memory of the electronic transaction chip for the desired data object includes identifying, by the transaction processing device, a desired plurality of data portions based on which of the plurality of data locations corresponds to the desired data object; and acquiring the desired data object includes:
   acquiring, by the transaction processing device, the desired plurality of data portions; and
   accessing, by the transaction processing device, the desired data object from the desired plurality of data portions.

\* \* \* \* \*